United States Patent [19]

Bossert et al.

[11] Patent Number: 6,028,128
[45] Date of Patent: Feb. 22, 2000

[54] METAL CONTAINING E-COAT CATALYSTS OPTIONALLY WITH TIN CATALYSTS

[75] Inventors: Emily C. Bossert, Wayne; Kevin Cannon, Hatboro; William D. Honnick, Exton, all of Pa.; Wayne Ranbom, Hopewell, N.J.

[73] Assignee: ELF Atochem North America, Inc., Philadelphia, Pa.

[21] Appl. No.: 09/174,912

[22] Filed: Oct. 19, 1998

Related U.S. Application Data

[60] Division of application No. 08/471,098, Jun. 6, 1995, and a continuation-in-part of application No. 08/097,854, Jul. 28, 1993.

[51] Int. Cl.$^7$ ................ C08K 3/20; C08L 63/02
[52] U.S. Cl. .............. 523/414; 523/458; 523/459; 528/55; 528/56
[58] Field of Search .............. 528/55, 56; 523/414, 523/458, 459

[56] References Cited

U.S. PATENT DOCUMENTS

| | | | |
|---|---|---|---|
| 4,017,438 | 4/1977 | Jerabek et al. | 204/181 |
| 4,256,621 | 3/1981 | Shimokai et al. | |
| 4,395,528 | 7/1983 | Leiner et al. | 528/45 |
| 4,611,044 | 9/1986 | Meyer et al. | 528/56 |
| 4,788,083 | 11/1988 | Dammann et al. | 427/340 |
| 4,865,704 | 9/1989 | Saatweber et al. | |
| 5,330,839 | 7/1994 | Yasouka et al. | |
| 5,340,852 | 8/1994 | Pille-Wolf et al. | 524/14 |
| 5,356,529 | 10/1994 | Eswarakishnan et al. | 205/224 |

OTHER PUBLICATIONS

Gum ed., Reaction Polymers, Hanser Publishers, p58, 1992.

*Primary Examiner*—Melvyn I. Marquis
*Assistant Examiner*—D. Aylward
*Attorney, Agent, or Firm*—Finnegan, Henderson, Farabow, Garrett & Dunner, L.L.P.

[57] ABSTRACT

The invention comprises a curable composition comprising: (i) a blocked reactive component wherein the blocked reactive component is a blocked isocyanate or a blocked isothiocyanate; (ii) a functional compound reactive with the blocked reactive component, the functional compound containing reactive hydrogen; (iii) a catalyst for promoting the reaction of the reactive component with the blocked functional compound, wherein said catalyst is based on the reaction product of manganese, cobalt, nickel, copper, zinc, germanium, antimony, or bismuth, or the oxides thereof with a mercaptan, or an organic acid, wherein said organic acid is hexanoic, oxalic, adipic, lactic, tartaric, salicylic, thioglycolic, succinic, or mercapto succinic acid, or the reaction product of copper or germanium, or the oxides thereof with a lower aliphatic acid. The manganese, cobalt, nickel, copper, zinc, germanium, antimony, or bismuth catalysts can be used in conjunction with other compounds to promote the reaction, especially compounds based on tin, preferably organotin compounds. Water soluble catalysts are preferred. The coating composition can be electrocoated on a conductive substrate and cured.

23 Claims, No Drawings

METAL CONTAINING E-COAT CATALYSTS OPTIONALLY WITH TIN CATALYSTS

REFERENCE TO RELATED APPLICATIONS

This is a division of application Ser. No. 08/471,098, filed Jun. 6, 1995 all of which is incorporated by reference.

The present application is a continuation-in-part of U.S. patent application Ser. No. 08/097,854 filed Jul. 28, 1993 which is incorporated herein by reference.

BACKGROUND OF THE INVENTION

1. Field of the Invention

The invention is directed to catalysts, a process, and a composition to promote the low temperature cure of blocked isocyanates and blocked isothiocyanates.

2. Description of Related Art

Catalysts are commonly used for curing blocked isocyanates with hydroxyl-containing compounds. These systems find applications in coatings, where the hydroxyl-containing compound is polymeric and the blocked isocyanate is multifunctional. Frequently, the blocking agent is an aliphatic alcohol, which imparts long pot life in one pot systems. Reaction of the hydroxyl containing compound with the multifunctional blocked isocyanate occurs at elevated temperatures in a cross-linking reaction which increases the molecular weight and results in a cured coating which has excellent solvent resistance.

Due to environmental considerations, the coatings industry has been turning to systems wherein the reactants are dissolved or dispersed in an aqueous system. These systems require the formation of stable solutions or dispersions and hydrolytic once stability for all reactants. In particular, primer coatings may be deposited from aqueous dispersions onto metal surfaces by electro coating such as cathodic deposition, as described by Bosso et al., U.S. Pat. No. 4,101,486.

Catalysts are usually needed in order to promote the curing reaction when the blocking agent is an aliphatic alcohol. Conventionally, these catalysts are stannous salts or mono- or diorganotin compounds which catalyze the curing or cross-linking reaction at temperatures in the range 330–365° F. It is often desirable to obtain curing reactions at lower temperatures in order to conserve energy, reduce deformation of plastic parts attached to the metal object, and reduce color formation.

Thiele et al. Plaste und Kautschuk, 36 January 1989 (1) pp. 1–3, disclose the reaction of phenylisocyanate and butanol in the presence of bis tributyltin oxide as a model reaction for urethane polymers wherein the addition of one mol percent water retarded the rate of reaction and caused a deviation in the linearity in Eyring diagrams. The retarding effect of the water may be reduced by increasing the temperature. The reference suggests that triorganotin catalysts are not suitable in aqueous systems where lower temperature cures are required.

Jerabek U.S. Pat. No. 4,031,050, Jerabek et al., U.S. Pat. No. 4,017,438 and Bosso et al. describe aqueous coating compositions based on blocked organic polyisocyanates, an amine adduct of an epoxy group-containing resin and a diorganotin catalyst. These compositions are cationic and may be electrodeposited on a cathode and are widely employed as primers for automotive substrates. In this process, a conductive article such as an auto body or an auto part is immersed in a bath of the aqueous coating and acts as an electronic in the electrodeposition process. An electric current is passed between the article and a counter-electrode in electrical contact with the aqueous coating until a desired coating thickness is deposited on the article. These coatings will be referred to herein as "E-coatings."

The coating operation may be conducted as a continuous process which requires the bath to be monitored and replenished periodically with the coating composition and/or components of the composition which are depleted as successive coating operations are carried out.

The diorganotin compound employed is a solid that is dispersed in the coating composition and in some instances will separate from the coating and deposit with other coating residues on the bottom of the tank which contains the coating bath. The amount of catalyst in the bath, therefore can be depleted requiring that it be replenished so that the cure of the coating is effected in a timely manner. Replenishing the solid catalyst can be difficult or a disadvantage since it has to be properly dispersed in a suitable medium before being introduced into the bath.

Although these cationic amine adducts of the epoxy resin cart be formulated with pigments and/or fillers, attempts are being made to provide coating systems that do not have any solid materials in them as a cost savings measure and also to eliminate various problems with solid materials settling to the bottom of the coating tank such as solid organotin compounds. These materials that settle have to be separated by an ultrafiltration process, and where catalyst is removed in this process, it has to be replaced. An essentially solids-free coating system would therefore be desirable to avoid or minimize the settling problem. Additionally, the expense of preparing such a coating could be reduced by eliminating any grinding step that would be required disperse catalysts and/or pigments, fillers and the like in the coating composition.

Coatings without pigments or fillers can be used as first coats in several applications where subsequent coats would provide the pigment materials that are in some instances necessary to protect the coating from ultraviolet radiation or other environmental hazards that could cause the coating to deteriorate at an unacceptable rate.

If coatings of this type can be applied electrolytically at a faster rate as well as cured at a faster rate, an increase in production rates would be obtained which represent a cost savings to the manufacturer.

Although the cationic amine-epoxy resins can be applied to metallic substrates electrolytically, these types of coatings are self-limiting by which it is meant that after a certain thickness, the coating build up slows and eventually stops since the coating material is insulating. Higher build coatings are an advantage since equivalent coating thicknesses can be applied more quickly or the full thickness of the coating can be quickly obtained to provide improved physical properties such as impact resistance, corrosion resistance and the like.

One problem encountered with some prior art coating of this type is the inability to obtain a sufficient coating thickness at the edge of the object being coated. Edges, with this reduced coating tend to wear or corrode faster and can be regions on the metal article where a loss of structural integrity will occur first.

It is also desirable to eliminate pigments and/or fitters in coating compositions of this type since they are a source of pinholing in the coating which compromises the integrity of the coating layer and consequently exposes the metal substrate to wear and corrosion.

It would therefore be an advantage to obtain a catalyst that would promote the cure of these type of coatings at substantially the same rate as the catalyst presently used and which would be easily incorporated into the coating composition and would not tend to separate during use. Catalysts that are liquids at coating conditions and which are either soluble or readily dispersible, i.e., emulsifiable in the coating composition would be especially preferred in this regard.

Chung et al. U.S. Pat. No. 5,116,914 notes that dibutyltin oxide, which is used as a catalyst in these aqueous coatings, is difficult to disperse whereas dibutyltin dilaurate can be hydrolyzed which causes cratering problems in the deposited film. The patentees describe the use of a dibutyltin diacetyl acetonate catalyst to avoid these problems.

Treadwell et al. U.S. Pat. No. 4,032,468 describes the use of a trimethyl or a trimethylmethoxytin oxide catalyst for the preparation of hydrolytically stable urethane foam precursors. The foam is formed by the reaction of Be isocyanate component of the urethane foam with water.

Coe U.S. Pat. No. 4,286,073 describes the use of tributyltin toluenesulfonate or methanesulfonate catalysts for the manufacture of urethanes whereas Groves, U.S. Pat. No. 4,087,412 teaches a mixture of trialkyltin oxide and a reaction product of a carboxylic acid and a dialkyl tin oxide catalyst for the formation of polyurethane polymers. Zemlin, U.S. Pat. No. 3,523,103 describes the use of a tri-organoditin catalyst for the formation of polyurethanes.

Accordingly, catalysts that would not detract from the stability of the electrolytic bath employed according to the Jerabek, Jerabek et al. and Bosso et al. patents would be advantageous. Additionally, it would be an advantage to provide a catalyst that had improved throwing power in such baths, i.e., an increase in the amount of coating deposited in remote areas.

Catalysts that also promote the deposition of coatings from these baths at a lower weight but afford equivalent protection as do heavier coatings are also desirable. When used as automotive coatings, this would result in some reduction in automobile weight leading to some measure of emission reduction and improvement in fuel economy. Other properties which are sought in these types of catalysts include improved ultrafiltration, reduced grind preparation, increased deposition rate, improved dispersability or emulsifiability, reduced cure temperatures, reduced toxicity easier handling, improved color maintenance, and a lower level of catalyst used.

SUMMARY OF THE INVENTION

Accordingly, the present invention is directed to a composition and a process that substantially obviates one or :more of these and other problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the composition of matter and process, particularly pointed out in the written description and claims hereof.

To achieve these and other advantages and in accordance with the purpose of the invention, as embodied and broadly described, the invention comprises a curable composition comprising:

(i) a blocked reactive component wherein the blocked reactive component is a blocked isocyanate or a blocked isothiocyanate;

(ii) a functional compound reactive with the blocked reactive component, the functional compound containing reactive hydrogen;

(iii) a catalyst for promoting the reaction of the reactive component with the blocked functional compound, wherein said catalyst is based on an element from Groups VIIB, VIII, IB, IIB, IVA or VA of the Periodic Table of the Elements.

The Group IVA elements in the foregoing list of elements is intended to exclude tin; however, the catalyst of the invention can be used in conjunction with other compounds to promote the reaction, especially compounds based on tin, preferably organotin compounds.

In another embodiment, the invention also relates to a curable composition comprising:

(i) a blocked reactive component wherein said blocked reactive component is a blocked isocyanate or a blocked isothiocyanate;

(ii) a functional compound reactive with said blocked reactive component, said functional compound containing active hydrogen;

(iii) a catalyst for promoting the reaction of the blocked reactive component with the functional compound, wherein said catalyst is based on the reaction product of manganese, cobalt, nickel, copper, zinc, germanium, or antimony, or the oxides thereof with a mercaptan, or an organic acid, or is based on the reaction product of bismuth with an organic acid, wherein the organic acid is hexanoic, oxalic, adipic, lactic, tartaric, salicylic, thioglycolic, succinic, or mercapto succinic acid, or the reaction product of copper or germanium or the oxides thereof with a lower aliphatic acid such as an aliphatic acid selected from formic, acetic, acrylic, methacrylic, propionic, butyric, hexanoic, octanoic, or decanoic acid.

Water soluble catalysts are preferred which comprise water soluble compounds based on the foregoing elements from The Periodic Table of the Elements. A further aspect of the invention comprises the foregoing composition admixed with water.

The invention also relates to a method for curing a blocked isocyanate or blocked isothiocyanate at a temperature below about 150° C. which comprises combining the catalyst of the invention with the aforesaid blocked reactive component and functional compound and heating at a temperature less than about 150° C. especially from about 130° to less than about 150° C. to obtain a cured urethane or thiourethane.

DETAILED DESCRIPTION

The invention relates to catalysts which promote the cure of blocked isocyanates and especially aliphatic alcohol-blocked isocyanates or isothiocyanates at temperatures lower than about 150° C.

The catalysts of the invention are also used with triorgano tin compounds, and it is unexpected that the triorganotin tin compounds, which are not conventional catalysts for urethane or thiourethane reactions should function as catalysts at lower temperatures than conventional diorganotin compounds such as dibutyltin oxide. The catalyst of the present invention is based on the elements from Groups VIIB, VIII, IB, IIB, IVA or VA of the Periodic Table of the Elements such as manganese, cobalt, nickel, copper, zinc, germanium, antimony, or bismuth, especially compounds based on an element from the foregoing Groups. In the written description and claims of the invention, the foregoing however, can be used with the catalysts, especially organo tin compounds and particularly triorgano tin compounds.

Metals from the foregoing Groups, such as divalent metals, and particularly chelates of metals, especially divalent metals, or oxides or salts of these metals and especially carbonate salts are preferred. Zinc, bismuth, and antimnoy are especially preferred metallic elements. Combinations of the catalysts are also included in the invention, especially the two, three or four component combinations.

Representative salts of these catalyst metals are based on inorganic acids, carboxylic acids, hydroxycarboxylic acids, alcohols, glycols and phenols.

Representative carboxylic acids include both mono and dicarboxylic acids containing from 1 to about 20 carbon atoms and include aliphatic and cycloaliphatic saturated or unsaturated acids, and aromatic acids, and include formic, acetic, acrylic, methacrylic, propionic, butyric, hexanoic, octanoic, decanoic, stearic, oleic, eiconsanoic and benzoic acids. Examples of dicarboxylic acids include oxalic, malic, maleic, succinic, sebacic and the various isomeric phthalic acids. Typical hydroxycarboxylic acids preferably contain from 2 to about 20 carbon atoms and include hydroxyacetic, lactic, citric, tartaric, salicylic, and gluconic acids.

Inorganic acids or the mineral acids include carbonic ac A, halogen acids such as hydrochloric, hydrobromic, and hydroiodic acids, nitrogen acids, sulfur acids and phosphorus acids, all of which are known in the art.

The alcohols comprise 1 to about 20 carbon atom straight chain or branched chain mono- or polyhydroxy alcohols, alkyl substituted or unsubstituted mononuclear or polynuclear mono or polyhydroxy cycloaliphatic alcohols and the like. The phenols comprise alkyl substituted or unsubstituted mononuclear or polynuclear mono or polyhydroxy phenols.

The carbonates of the aforesaid metals may exist as pure carbonates or as basic carbonates which are believed to be mixtures of the carbonate and the oxide or hydroxide of the metal in a single molecule and include metal carbonates such as basic zinc carbonate, basic copper carbonate and the like.

The chelates of the aforesaid metals that may be employed may be based on any metal chelating compounds known in the art but typically comprise beta-diketones such as acetylacetone to provide the acetylacetonates of the metals.

Metal catalysts that are generally suitable in this regard comprise the oxides, carbonates and acetylacetonates.

Some specific metal catalysts that may be employed comprise zinc carbonate (basic), zinc acetylacetonate, zinc acetate, copper acetylacetonate, iron acetylacetonate, nickel acetylacetonate, zinc lactate, and copper acetate. These catalysts are generally described by Leiner and Bossert U.S. Pat. No. 4,395,528 which is incorporated herein by reference.

It has been discovered, according to another aspect of the invention that any organic compound containing at least one SH group preferably with one or more OH groups, and especially at least one 2-hydroxy group, can be reacted with a catalyst compound, and in many instances will form a water soluble catalyst. These reaction products have also been found to stabilize the combination of triorganotin compounds and the catalysts of the invention, especially triorganotin compounds such as TOTO and the foregoing metal catalysts, and especially zinc oxide.

These mercaptans, and especially the 2-hydroxy mercaptans, have up to about 20 carbon atoms and especially from about 2 to 20 carbon atoms and preferably from about 3 to about 15 carbon atoms.

These compounds may be illustrated by the following formula:

$$(HO)_x R(SH)_y$$

where $x=0$ to about 5, especially 1 to about 5, and $y=1$ to about 5. The organic radical R will up to about 20 carbon atoms, especially from 2 to about 20 carbon atoms, preferably from about 3 to about 15 carbon atoms, where R is aliphatic, including a straight chain or branched chain aliphatic group, whether substituted or unsubstituted where the substituents are alkyl ether, alkyl thioether, alkyl carboxylate, or an aryl, cycloalkane or cycloalkene ether, thioether or carboxylate. Additionally R can be an aryl group including a polynuclear aryl group, a cycloalkane group including polynuclear cycloalkanes, or cycloalkene group including polynuclear cycloalkenes where the cyclic or aromatic groups may be substituted or unsubstituted especially by alkyl groups and especially alkyl groups having from 1 to about 5 carbon atoms.

Examples of these compounds include thioglycerol, 2-thioethyl alcohol and n-dodecylmercaptan. Hydroxy mercaptans are especially preferred since it is believed that the hydroxy groups increase the compatibility of the catalyst system with aqueous E-coating compositions and also because the hydroxy groups may form chelating sites for the metal catalyst. Mixtures of the aforementioned mercaptans and/or hydroxy mercaptans can be used, especially the two component, three component or four component mixtures.

In the preferred method for preparing the catalyst system comprising a metal catalyst, the mercaptan or hydroxy mercaptan is first reacted with the metal catalyst in a solvent and dried to obtain a thio catalyst. A solution of the thio catalyst is then prepared, and if desired, an organotin compound added such as TOTO, and then the resultant product dried to a free flowing powder catalyst which is readily dispersible, and in some instances soluble in the aqueous E-coating composition. Where this catalyst is used in combination with an organotin compound, some of the reaction of the thio group with the oganotin is avoided by reacting the mercaptan or the hydroxy mercaptan with the catalyst first.

Although the inventors do not want to be limited by any theory, it is believed that the catalytic activity of the organotin compound or TOTO is reduced when it is reacted with the hydroxy mercaptan or mercaptan such as thio glycerol or dodecyl mercaptan. This problem is avoided or minimized by employing the preferred method of manufacturing the catalyst system.

Alternatively, the organotin compound such as TOTO and the metal catalyst such as zinc oxide and the mercaptan or hydroxy mercaptan can be added simultaneously to a reaction vessel in the presence of a solvent. In both methods, an exotherm occurs which indicates a reaction occurs with the organotin compound and/or catalyst. Heating was not required beyond that which occurred as a result of the exotherm.

The reaction may be conducted in any solvent that will not interfere with the reaction, especially organic solvents such as the Carbitol® or Cellosolve® solvents or ketones. Suitable ketones are those having anywhere from 3 to about 10 carbon atoms l and especially from about 3 to about 6 carbon atoms and include methyliosobutyl ketone, diisobutyl ketone, methylamyl ketone, acetone, and the like. Mixtures of solvents can be used such as two, three or four component mixtures.

In one aspect of the invention, the catalyst system is prepared so that the solvent is rapidly driven off to yield a single component free flowing powder that is readily dispersed with stirring into an E-coating composition. Powders prepared in this way do not require milling into the coating composition. Various methods may be employed for rapidly driving off the solvents or volatile components employed in manufacturing of the catalyst system including spray drying, dry blending the components under vacuum, rotary drying relying primarily on tumbling, fluid bed drying or ribbon blending. Examples of sources of commercial equipment for conducting such drying steps are GEMCO (General Machine Company of New Jersey) for rotary dryers; Nirro, Md. for spray dryers; Littleford-Day Corp., Ohio for Littleford dryers or ribbon blenders; or FMC, Pa., or Swenson, Ill. for fluid bed dryers.

The mercaptan or hydroxy mercaptan is employed in the catalyst system in a stoichiometric amount, based on the mercapto groups present, the catalyst, and when employed, the organotin compound. Slightly more or slightly less than a stoichiometric amount of the mercaptan or hydroxy mercaptan can also be employed e. g. anywhere from about a St to about a 10% stoichiomentric difference. The mercapto groups react with the catalyst and, when employed, the organotin compound on a one to one stoichiometric basis.

The catalyst or catalyst triorganotin mixture is employed in an amount of from about 0.01 wt % to about 2 wt % and especially from about 0.05 wt % to about 1 wt % of catalyst metal based on total resin solids. In the catalyst triorganotin catalyst mixtures, the triorganotin containing catalysts are employed in an amount of from 0 wt % to about 95 wt % and especially from about 0 wt % to about 80 wt % based on tin metal in the triorganotin catalyst, the balance being based on the weight of the metal in the catalyst.

The catalysts of the present invention can also be employed in combination with other known urethane catalysts, and include known metal compounds other than organotins, which are used as urethane catalysts, as well as basic materials such as amines and alkali metal or alkaline earth metal salts and compounds. Tertiary amines having relatively high basicity are especially suitable in this regard. Additionally, azo compounds can be employed such as 1,4-diazabicyclo[2.2.2]octane, also known as triethylenediamine as well as 1-azabicyclo[2.2.2]octane and 1,8-diazabicyclo[5.3.0]-undec-7-ene.

Heterocyclic nitrogen compounds can also be employed such as pyridine, pyrazine, pyrimidine, pyridazine, indolizine, phenazine,. isoquinoline, quinoline, phthalazine, naphthrydine, quinoxaline, quinazoline, cinnoline and their derivatives.

Other amines and especially tertiary amines that may be employed as co-catalysts such as tri-lower alkyl amines are further described in Kirk-Othmer Encyclopedia of Chemical Technology, Third Edition under the heading "Amines" which is incorporated herein by reference. Additionally, potassium salts of carboxylic acids, ammonium salts of carboxylic acids and other tertiary amines, such as 2,4,6-tris (N,N-dimethylaminomethyl)-phenol, 1,3,5-tris (3-dimethylaminopropyl)hexahydro-s-triazone, as; well as ammonium salts can be used.

Other compounds that may be employed with the catalysts of the invention include lithium oxide; sodium and potassium alkoxides; sodium formate, carbonate, benzoate, and borohydride; potassium and calcium acetates; alkali soaps; metal naphthenates; N,N-dimethylformamide; and Friedel Crafts-type catalysts. Additionally, potassium salts of carboxylic acids, ammonium salts of carboxylic acids and other tertiary amines, such as 2,4,6-tris (N,N-dimethylaminomethyl)-phenol, 1,3,5-tris (3-dimethylaminopropyl)hexahydro-s-triazone, as well as ammonium salts can be used.

Organotin compounds that may be employed with the catalysts of the invention, also for promoting the reaction of a blocked isocyanate or isothiocyanate with a compound having active hydrogen comprise tri organotin compounds such as: $R_3SnA$ wherein each R is a hydrocarbyl group bonded directly to tin through carbon and may be the same or different, branched or unbranched, saturated or unsaturated, substituted or unsubstituted comprising $C_1$ to about $C_{21}$ and especially $C_1$ to about $C_{18}$ alkyl, $C_6$ to about $C_{20}$ aryl, cycloalkyl, alkaryl, vinyl and allyl, A is a carboxylate, $-O-SnR_3$, $-S-SnR_3$, $-O-SnR_2X$, $-O-SnRX_2$, $-SR$,

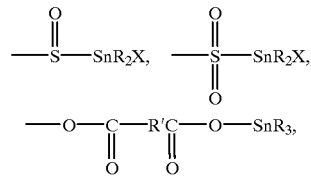

$-SR'$ $SSnR_3$, $-SnR_3$,

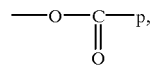

X in which R is as defined above, R' is a divalent hydrocarbyl group which may be saturated or unsaturated, branched or unbranched, substituted or unsubstituted, aryl $C_6$ to about $C_{20}$, alkyne of about $C_4$ to about $C_{20}$, "p" represents a polymer of about 5 to a about 1000 repeating units, X is an anion comprising chlorine, bromine, iodine, fluorine, hydroxyl, carboxyl, alkoxy, hydride, sulfonate, toluene sulfonate, $C_1$-$C_5$ alkyl sulfonate, phosphate, silicate, carbonate and isocyanate.

These catalysts comprise:

Triorganotin compounds for the reaction of "blocked" isocyanates with active hydrogen components and include:

I. bis-(triorganotin)oxides of the formula:

$R^1R^2R^3Sn-O-SnR^4R^5R^6$ wherein each R is a hydrocarbyl group bonded directly to tin through carbon and may he the same or different and is:

alkyl of $C_1$ to about $C_{18}$ which may be branched or unbranched, saturated or unsaturated, substituted or unsubstituted; aryl, alkaryl, cycloalkyl, vinyl or allyl, all of which may be substituted or unsubstituted by halo, hydroxyl, $C_1$ to about $C_{10}$ aryl and $C_1$ to about $C_5$ alkyl groups.

Examples of this class of triorganotins include:
bis(trimethyltin)oxide
bis(triethyltin)oxide
bis(tripropyltin)oxide
bis(tributyltin)oxide
bis(triamyltin)oxide
bis(trihexyltin)oxide
bis(triheptyltin)oxide
bis(trioctyltin)oxide
bis(tri-2-ethylhexyltin)oxide
bis(trinonyltin)oxide
bis(tridecyltin)oxide
bis(tridodecyltin)oxide
bis [tris(tridecyl)tin] oxide
bis [tris(pentadecyl)tin] oxide
bis [tris(hexadecyl)tin] oxide
bis [tris(heptadecyl)tin] oxide
bis [tris(octadecyl)tin] oxide
(trimethyltin)(tributyltin)oxide
(tributyltin)(tri-n-octyltin)oxide
(trioctyltin)(trioctadecyltin)oxide (dioctylbutyltin)(trioctyltin)oxide
bis(trioleyltin)oxide
bis(3,3,5 trimethylpentyltin)oxide
bis(triphenyltin)oxide
bis(tricyclohexyltin)oxide
bis(tribenzyltin)oxide
bis(trivinyltin)oxide
bis(triallyltin)oxide
(triallyltin)(trioctyltin)oxide
bis(tritolyltin)oxide
bis [tri(monohydroxyoctyl)tin] oxide
bis(tri-para-chlorophenyltin)oxide II. bis(triorganotin)sulfide of the formula:
$R^1R^2R^3Sn—S—SnR^4R^5R^6$ wherein each R is a hydrocarbyl group bonded to tin and is taken from the same R groups as described in I. above.

Examples of this class include:
bis(trioctyltin)sulfide
bis(tributyltin)sulfide
bis(trilauryltin)sulfide
bis(triphenyltin)sulfide III. (triorganotin)(diorgano x tin)oxide of the formula:
$R^1R^2R^3Sn—O—SnR^4R^5X$ wherein each R group is a hydrocarbyl group bonded to tin through carbon and is taken from the same R groups as described in I. above. X is carboxyl of 1 to about 20 carbon atoms, halide, hydroxyl, sulfate, mercapto, the residue of a mercapto acid, mercapto alcohol or esters thereof.

Examples of this class include:
(trioctyltin)(dioctylmethoxytin)oxide
(tri-2-ethylhexyltin)(dioctylchlorotin)oxide
(trioctyltin)(dioctyllaurylcarboxytin)oxide
(trioctyltin)(dioctylhydroxytin)oxide
(tributyltin)(dibutyliso-octylmercaptoacetatotin)oxide IV. (Triorganotin)(diorgano x tin)sulfides and sulfones of the formula:
$(R_1R^2R^3Sn)—S—(R, R, XSn)$ Sulfides wherein each R group is a hydrocarbyl group bonded to tin through carbon and is taken from the same R groups as described in I. above. X is carboxyl of $C_1$ to about $C_{20}$ atoms, halide, hyroxyl, sulfate, mercapto, a residue of a mercapto acid, mercapto alcohol or esters thereof. S is sulfur or sulfone.

Examples of the class include:
(trioctyltin)(dioctyl, chlorotin)sulfide
(trioctyltin)(dioctyl, hydroxytin)sulfone V. bis(triorganotin)dicarboxylates of the formula:
$R^1R^2R^3SrQ_2C—X—CO_2—Sn—R^4, R^5, R^6$ wherein each R is a hydrocarbyl group bonded to tin through carbon and is taken from the same R groups as described in I. above. X is an alkyl group of $C_1$ to about $C_{18}$, alkenyl of $C_2$ to about $C_{18}$, alkyne of about $C_4$, cyclohexenyl.

Examples of this class includes:
bis(trioctyltin)adipate
bis(tributyltin)maleate
bis(trioctyltin)cyclohexene dicarboxylate VI. bis(triorganotin)dimercaptide of the formula:
$R^1R^2R^3Sn—S—X—S—SnR^4R^5R^6$ wherein each R is a hydrocarbyl group bonded to tin through carbon and is taken from the same R groups as described in I. above. X is an alkyl group of $C_1$ to about $C_{18}$, alkyne of about $C_4$, cyclohexenyl or paraxylyl.

Examples of this class include:
bis (trioctyltin) αα dimercaptoparaxylene
bis(trioctyltin)cyclohexenedimercaptide
(trioctyltin)(dioctyl, lauryltin)dimercapto hexylene VII. Triorgantoin Salts of the formula:
$R^1R^2R^3 Sn X$ wherein each R is a hydrocarbyl group bonded to tin through carbon and is taken from the same R groups as in I above. X is halo, chloro, bromo, iodo, fluoro, $C_1$ to about $C_5$ alkoxy, hydroxy, carbonate, phosphate, phosphinate, isocyanate, sulfonate, carboxyl substituted or unsubstituted of $C_1$ to about $C_{20}$ carbon atoms, siloxinate, ethoxylate.

Examples of this class include:
tributyltinfluoride
trioctyltinchloride
trioctyltinoctanoate
trioctyltinmethoxide
trioctyltinhydroxide
trioctyltincarbonate
tributyltinphosphate
trilauryltinphosphate
trioctyltinisocyanate
trioctyltinphenate
trioctyltin-9, 10-dihydroxystearate VIII. (triorganotin)(mono-organtotin)oxides of the formula:
$R^1R^2R^3Sn—O—SnR^4XY$ wherein each R is a hydrocarbyl group bonded to tin through carbon and is taken from the same R group described in I. above. X and Y may be the same or different and are halo, chloro, bromo, fluoro, hydroxyl, oxy, sulfur, carboxylate of $C_1$ to about $C_{20}$, alkoxy, a mercapto residue of a mercapto alcohol, mercapto acid or esters thereof.

Examples of the class include:
(trioctyltin)(mono-octyldihydroxytin)oxide
(triphenyltin)(monobutyldichlorotin)oxide IX. bis(triorgano) ditin of the formula:
$R^1R^2R^3Sn—SnR^4, R^5, R^6$ wherein R is a hydrocarbyl group bonded directly to tin through carbon and is taken from the same R groups as defined in I. above.

Examples of the class include:
bis(trioctyl) ditin
bis(tributyl) ditin

X. Polymer bound triorganotin of the formula:

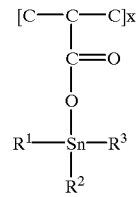

wherein each R is a hydrocarbyl group bonded to tin through carbon and is taken from the same R groups described in I. above. $[C—C—C—C]_X$ is representative of a polymer backbone group having a molecular weight of 2000 or greater, such as:

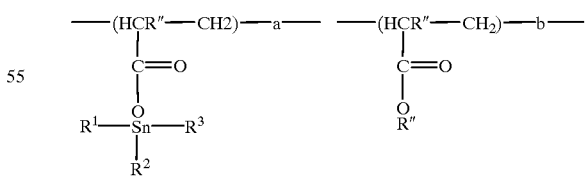

when R is as defined above, R" is hydrogen, methyl or ethyl, a+b represent a polymer of about 5 to about 1000 repeating units, b÷a is from about 1 to about 20 and especially from about 3 to about 10.

It is to be understood that commercially produced products of the above described triorganotins may contain small quantities of organotin compound other than the principle component. It is also to be understood that where di or multifunctional anions or cations are present in the triorgantin structure, oligomerization, cyclization or polymerization may occur. Further, in all triorganotin components except when $R^1R^2R^3$ and $R^4R^5R^6$ are the same, equilibrium, mixtures may exist. Mixtures, and especially two, three or four component mixtures of the foregoing compound may also be used.

Triorganotin compounds useful in the reaction of blocked isocyanates with active hydrogen containing materials such as polyols depend not only on the structure and physical form of the triorganotin compound, but also on the presence or absence of solvents, processing temperature, and the composition of the reactants.

Where A is a carboxylate in the foregoing generic description of the catalysts, the carboxylate is derived from the various organic acids herein, and especially the hydroxy carboxylic acids described including, citric, lactic and tartaric acid.

Organotin compounds that may be especially employed according to the invention comprise tributyltin oxide and especially bis(tri-n-butyltin)oxide, bis(trioctyltin)oxide and especially bis(tri-2-ethylhexyltin)oxide, bis(triphenyltin) oxide and triphenyltin hydroxide and other triorganotin compounds such as tributyltin fluoride, triallyltin chloride, tributyltin hydride, triphenyltin hydride, tributyltin hydroxide, tributyltin methoxide, tributyltin butoxide, tributyltin acetate, tributyl N-piperazinylthiocarbonylmercaptide, tributyltinphosphorus dibutoxide, and bistributyltin oxide. Other tin compounds that may be employed comprise tributyltin toluenesulfonate and tributyltin methanesulfonate, bis (trimethyltin)oxide, bis(dimethylmethoxytin)oxide and organoditin compounds such as hexabenzylditin, bis-trimethyltin, hexaethylditin, hexa-n-butylditin, hexaphenylditin, hexastearylditin, hexalaurylditin, trilauryltributylditin, hexaoctylditin. Various mixtures of the aforesaid tin compounds can be used, especially the two or three or four component mixtures.

This triorgano tin compound in which each hydrocarbyl group bonded to tin is an alkyl group of $C_5$ to $C_{21}$ including $C_8$ to $C_{21}$ exhibits low toxicity and coating compositions using these catalysts present reduced environmental and health hazards. These are the preferred catalysts of the invention.

In general, it is desirable that the triorganotin compound be a liquid at room temperature (about 25° C.) or be soluble in the reactant or conventionally employed solvent compatible with the system. Thus, the choice of triorganotin compound will be strongly influenced by the total system and the result sought.

Where the triorganotin compounds comprise trialkyl tin compounds, alkyl chain lengths from about 5 to about 12 carbon atoms are especially preferred. When the number of carbon atoms in the alkyl chain is greater than about 12, the compounds tend to be waxy solids at room temperature. Where the alkyl chain contains less than about 5 carbon atoms, the toxicity of the compounds begins to become unacceptable. A preferred triorganotin compound in this regard comprises bis(trioctyltin)oxide (TOTO).

Generally, the toxicity of tin compounds increases as the organic substituents on the tin atom increase from one to two to three whereas there is a decrease in toxicity with increasing alkyl chain length where the organotin compound is alkyl substituted. However, the extraordinary decrease in toxicity on TOTO due to alkyl chain length is quite unexpected. The relatively low toxicity of TOTO which makes it especially suitable. in industrial coating applications is illustrated by the following:

| Test | Result | Comment |
|---|---|---|
| Acute Oral | $LD_{50}$ > 5000 mg/Kg | Practically Nontoxic to Rats |
| Acute Dermal | $LD_{50}$ > 2000 mg/Kg | No More than Slightly |
| Primary Dermal Irritation | 1.75/8.0 | Slightly Irritating to Rabbits |
| Primary Eye Irritation | 2.8/110.0 | Slightly Irritating to Rabbits |
| Mutation Assays Ames/Salmonella and E. Coli | Not Mutagenic | |
| Aquatic Toxicity 48 h $LC_{50}$ Daphnia | >87,000 mg/L (solubility limit) | 0.002 mg/L for TBTO |
| Aquatic Toxicity 96 h $LC_{50}$ Flathead Minnow | >13,500 mg/L (solubility limit) | 0.05 mg/L for TBTO |

The data in the foregoing table show that TOTO is significantly less toxic than TBTO and in fact the toxicity exceeds the solubility of TOTO in water.

The monorgano tin and diorgano tin compounds that comprise part of the present catalyst compositions are conventional catalysts for the reaction of hydroxyl-containing organic molecules with isocyanates to form urethane groups. Representative members of this class of tin compounds include stannous salts of carboxylic acids, organostannonic acids such as butylstannonic acid, organothiostannonic acids, diorganotin oxides such as dibutyltin oxide, diorganotin sulfides, mono- and diorganotin halides such as dimethyltin dichloride, mono- and diorganotin carboxylates such as dibutyltin dilaurate, dibutyltin adipate and dibutyltin maleate, mono- and diorganotin mercaptides such as dibutyltin bis(lauryl mercaptide), mono- and diorganotin derivatives of mercaptocarboxylic acid esters and mercaptoalkanol esters such as dibutyltin-S,S'-bis-(isooctyl mercaptoacetate) and dibutyltin S,S'-bis(mercaptoethyl stearate), diorganotin oxides such as dibutyltin oxide and mono- and diorganotin derivatives of β-diketones such as dibutyltin bis-acetylacetonate, and other chelating agents such as 4-hydroxycoumarin and 8-hydroxyquinoline, that contain at least one hydroxyl or carbonyl group.

In a narrower embodiment of this invention the tin compound can be represented by the formula $Sn(OOCR^1)_2$, $(R^2)_a Sn(OOCR^3)_{4-a}$, $(R^2)_a Sn(SR^4)_{4-a}$, $(R^2)_a SnY_2$ or $(R^2)_a SnO$, where $R^1$ and $R^3$ are the same or different hydrocarbyl groups, $R^2$ is alkyl containing from 1 to 20 carbon atoms or cycloalkyl containing from 5 to about 8 carbon atoms, $R^4$ is selected from the same group as $R^1$. Alternatively, $R^4$ can be —$R^5$–$COOR^6$ or —$R^7OOCR^6$ wherein $R^5$ is alkylene and contains from 1 to 20 carbon atoms, $R^6$ is selected from the same group as $R^1$, $R^7$ is alkylene and contains from 2 to 20 carbon atoms, Y represents a halogen atom or the residue remaining following removal of the active or labile hydrogen atom from a β-diketone or other βdisubstituted chelating agent and α is 1 or 2.

As herein the term "hydrocarbyl" is defined as the residue remaining following removal of a hydrogen atom from a saturated or ethylenically unsaturated hydrocarbon that can be unsubstituted or contain one or more inert substituents. The hydrocarbyl group can be alkyl containing from 1 to 20 carbon atoms, alkenyl containing from 2 to 20 atoms, cycloalkyl, aryl, alkaryl or aralkyl. When the hydrocarbyl group is alkyl it contains from 1 to 20 carbon atoms and can be, for example, methyl, ethyl, n-propyl, n-butyl or the isomeric hexyl, octyl, decyl, dodecyl, hexadecyl and eicosyl groups. Any hydrocarbyl group may optionally contain one or more inert substituents that will not adversely affect the activity of the catalyst composition. Representative substituents include alkoxy, thioalkoxy, hydroxyl and carboalkoxy.

The group represented by $R^2$ is preferably alkyl, most preferably methyl, butyl or octyl. This preference is based on the fact that methyl, butyl- and octyltin compounds and the intermediates for preparing these compounds are often more readily available than other organotin compounds.

When a hydrocarbyl group is alkenyl it contains from 20 carbon atoms and can be, for example, vinyl, allyl or oleoyl. Representative cycloalkyl groups include cyclopentyl, cyclohexyl and cyclooctyl. When the hydrocarbyl group is aryl it can be phenyl, naphthyl, anthracenyl or phenanthryl. Aralkyl is represented by benzyl and β-phenylethyl and alkaryl is represented by the isomeric tolyl and xylyl groups. The alkyl portion of any aralkyl or alkaryl group contains from 1 to about 20 carbon atoms.

When the catalyst compositions of this invention are employed in combination with aqueous dispersions or emulsions of film-forming polymers, such as the amine-modified epoxide polymers disclosed in the aforementioned U.S. Pat. No. 4,031,050, to achieve maximum curing rate and solvent resistance the tin compound is preferably a dialkyltin oxide or a dialkyltin bis-β-diketonate.

It is desirable to be able to provide a single package that. includes both the catalyst and the co-catalyst but it has been found that in certain E-coating formulations that it is difficult: to disperse both the insoluble organotin compound and insoluble I catalyst, especially TOTO and zinc based catalysts without adversely impacting the E-coating formulation, as for example, by introducing lumps into the coating composition. Combining the various catalyst components separately is no problem. For example, zinc oxide can be dispersed in the aqueous resin E-coating composition by grinding the zinc oxide with a grind resin in a milling media which is well known in the art. The mixture obtained is added to a dispersion of the resin containing the tin compound. However, by supporting the organotin compound such as TOTO on a readily dispersible, finally divided support for both the tin compound and the catalyst, they can be packaged stably together to form a catalyst "system," or "combination" and then later dispersed rapidly into an E-coating bath.

The terms "isocyanate" and isothiocyanates are used herein to refer to mono- and polyisocyanates and to mono- and polyisothiocyanates, respectively, including particularly diisocyanates and diisothiocyanates. While the invention has been described specifically with reference to the reaction of certain diisocyanates, it is generally applicable to the reaction of any compound containing one or more —N═C═Y groups in which Y is oxygen or sulfur. Examples of polyisocyanates suitable for the present invention include aliphatic compounds such as trimethylene, tetramethylene, pentamethylene, hexamethylene, 1,2-propylene, 1,2- butylene, 2,3-butylene, 1,3-butylene, ethylidine and butylidene diisocyanates. Additionally, the cycloalkylene diisocyanates can be employed such as 1,3-cyclopentane, 1,4-cyclohexane, and 1,2-cyclohexane diisocyanates. The aromatic diisocyanates may also be used such as m-phenylene, p-phenylene, 4,4'-diphenyl, 1,5-naphthalene and 1,4-napthalene diisocyanates asi well as the aliphatic-aromatic diisocyanates such as 4,4'-diphenylene methane, 2,4-or 2,6-tolylene or mixtures thereof, 4,4'-toluidine, and 1,4-xylylene diisocyanates. The nuclear substituted aromatic diisocyanates may also be employed such as iianisidine diisocyanate, 4,4'-diphenylether diisocyanate and chlorodiphenylene diisocyanate, 1,8-diisocyanato-p-menthane, 1-methyl-2,4-diisocyanatocyclohexane, chlorophenylene diisocyanates, diphenyl-methane-4,4 t-diisocyanate and naphthalene-1,5-diisocyanate. Additionally, the triisocyanates such as triphenyl methane-4,4',4"-triisocyanate, 1,3,5-triisocyanate benzene and 2,4,6-triisocyanate toluene may also be employed. Tetraisocyanates may be utilized such as 4,4'-diphenyl-dimethyl methane-2,2',5,5,-tetraisocyanate as well as other isocyanates such as xylylene-α,α'-diisothiocyanate, isopropylbenzene-α,4-diisocyanate and polymerized polyisocyanates such as tolulene diisocyanate dimers and trimers; dianisidine, diisocyanate (CAS Registry No. 91-93-0); tolidine diisocyanate (CAS Registry No. 91-97-4); biuret of hexamethylene diisocyanate (CAS Registry No. 4035-89-6); isophorone diisocyanate (CAS Registry No. 4098-71-9); polymeric diphenolmethane diisocyanate (CAS Registry No. 9016-87-9) or 4,4'-dicyclohexylmethane diisocyanate. Various mixtures of isocyanate may also be used especially the two, three, or four component mixtures.

The organic polyisocyanates may also be a prepolymer derived from a polyol and a polyisocyanate so that the polyol contains an isocyanate group or groups where the polyols include polyether polyols or polyester polyols or simple polyols such as glycols, including ethylene glycol and propylene glycol as well as glycerol, trimethylolpropane, hexanetriol, pentaerythritol, and the like.

As noted herein, the isocyanate of the present invention comprises a blocked isocyanate which is to say that the reactive isocyanate groups are reacted with any suitable aliphatic, cycloaliphatic, aromatic, or alkyl monoalcohol or phenolic compounds such as, for example, lower aliphatic alcohols including methyl, ethyl, chloroethyl, propyl, butyl, amyl, hexyl, heptyl, octyl, nonyl, decyl and lauryl alcohols, and 3,3,5-trimethylhexanol and the like. The aromatic-alkyl alcohols include phenylcarbinol and methylphenylcarbinol. Glycol ethers may be employed such as ethyl glycol monoethyl ether, ethyl glycol monobutyl ether and equivalents thereof. The phenolic compounds which may be employed comprise phenol, substituted phenols such as cresol, xylenol, nitrophenol, chlorophenol, ethyl phenol, t-butyl phenol and 2,5-di-t-butyl-4-hydroxy toluene. Other blocking agents that may be employed include tertiary hydroxyl amines such as diethylethanolamine, lactams such as caprolactam and oximes such as methyl ethyl ketone oxime, acetone oxime and cyclohexanone oxime. Use of the oximes and phenols in some instances is desirable because some specific polyisocyanates blocked with these oximes or phenols uncap at relatively low temperatures.

Bis(cyclic ureas) are blocked aliphatic diisocyanates and are preferred in some embodiments because no by-products are formed upon thermal release of the reactive isocyanate groups. These comprise compounds that can be referred to as self blocked isocyanates. Examples of these bis-cyclic ureas are described by Ulrich, *ACS Symp*. Ser. 172 519

(1981), Sherwood, *J. Coat. Technol.* 54 (689), 61 (1982) and Kirk-Othmer *Encyclopedia of Chemical Technology*, Third Edition, Volume 23, p. 584 all of which are incorporated herein by reference. Blocked isocyanates of the following formula [bis(cyclic ureas)] are especially of interest where R is a $C_1$ to about $C_{10}$ hydrocarbon radical:

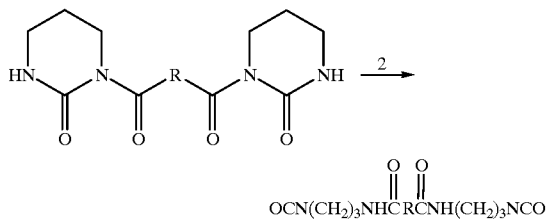

$$OCN(CH_2)_3NHC\overset{O}{\overset{\|}{C}}\overset{O}{\overset{\|}{RC}}NH(CH_2)_3NCO$$

The blocked reactive isocyanate or isothiocyanate of the present invention is reacted with a functional compound containing a reactive hydrogen as determined by the Zerewitinoff method described in *J. Am. Chem. Soc.*, Vol. 49, p. 3181 (1927). These compounds containing active hydrogens comprise compounds used for manufacturing a polyisocyanate prepolymer as previously described, e.g., polyols including polyether polyols or polyester polyols which is to say compounds containing hydroxyl groups. Additionally, compounds containing amino groups are also included within those materials that are functional compounds containing reactive hydrogen but generally include all compounds which give a positive test for reactive hydrogen as determined by the Zerewitinoff method. These compounds include but are not limited to, alcohols, hydroperoxides, phenols, boronic acids, carboxylic acids, percarboxylic acids and sulfonic acids and the like. Also included within this group are compounds containing a nitrogen-hydrogen bond such as amines, amides, lactams, ureas, urethanes, allophanates, biurets, acyl ureas, thioureas, hydrazines, oximes, amidines, hydroxylamines, hydrazones, hydroxamic acids, nitramines, diazoamino compounds and sulfonamides. Compounds containing a sulfur-hydrogen bond are also included such as mercaptans, thiophenols and thioacids. Other compounds which are included are halogen acids, compounds containing active methylene groups and compounds capable of forming enols such as acetone, malonic esters, acetoacetic esters, acetylacetone and nitromethane and miscellaneous active hydrogen-containing compounds such as acetylenic compounds and dialkyl phosphonates. Compounds containing two or more or any one or combination of active hydrogen groups already described are also included.

The functional compound may also comprise a resin which is an adduct of a primary and/or secondary amine with an epoxy group-containing resin or a resin which is an adduct of an amine-acid salt with a polyepoxide.

The epoxy material utilized to form the adduct can he any monomeric or polymeric compound or mixture of compounds having an average of one or more epoxy groups per molecule. A particularly useful class of polyepoxides are the polyglycidyl ethers of polyphenols such as Bisphenol A or polyepoxides produced from novolac resins or similar polyphenol resins. These epoxy resins are especially suitable for the preparation of amine adducts of epoxy resins which are based on primary or secondary amines and especially secondary amines and where the adducts are further reacted with an acid to provide cationic groups in the adduct.

Other polyglycidyl ethers of polyhydric alcohols may be employed, such as those based on ethylene glycol and the like as well as polyglycidyl esters of polycarboxylic acids. Polyepoxides derived from the epoxidation of an olefinically unsaturated alicyclic compound can also be used. Other epoxy-containing compounds and resins that may be employed include nitrogenous diepoxides such as those disclosed in United States Patent Number U.S. Pat. No. 3,365,471; U.S. Pat. No. 3,391,097; U.S. Pat. No. 3,450,711; U.S. Pat. No. 3,312,664;

U.S. Pat. No. 3,503,979 and British Patent No. 1,172,916 all of which are incorporated herein by reference.

Another class of polyepoxides which may be employed are acrylic polymers formed by copolymerizing an unsaturated epoxy-containing monomer such as, for example, glycidyl acrylic acid, glycidyl acrylates or methacrylates, a hydroxyl-containing unsaturated monomer such as a hydroxyalkyl ester of an acrylic acid or methacrylic acid and at least one other unsaturated monomer such as styrene, alpha-methylstyrene, vinyl toluene and the like or olefinic acids and esters of acrylic acid or methacrylic acid such as, methyl acrylate, ethyl acrylate, methyl methacrylate and the like. These epoxy resins are especially suitable for the preparation of solubilized polyepoxide adducts having a quaternary ammonium salt group era., those having a backbone derived from the interpolymerization of an olefinically unsaturated glycidyl compound, a hydroxy alkyl ester of an acrylic acid or methacrylic acid and at least one other olefinically unsaturated monomer. Polyglycidyl ethers of a polyphenol may also be employed as epoxy resins in the preparation of the solubilized polyepoxide adducts having quaternary ammonium salt groups.

Epoxy resins which are an adduct of a primary and/or a secondary amine may be obtained by reacting such epoxy resins with an amine such as a water soluble amino compound including mono- and dialkylamines such as methylamine, ethylamine, propylamine, butylamine, dimethylamine, diethylamine, dipropylamine, dibutylamine, methylbutylamine, and the like. Higher molecular weight monoamines may be employed where it is preferred that the molecule be more flexible. Further, a mixture of low molecular weight and high molecular weight amines may also be employed to modify resin properties.

Quaternary ammonium group-containing epoxy resins are obtained by reacting the polyepoxide with an amine-acid salt, preferably a tertiary amine-acid salt, to form a Quaternary amine salt group-containing resin. Primary and secondary amine-acid salts may be employed but the tertiary amine-acid salt is preferred.

Examples of amine-acid salts which may be employed include amine salts of boric acid or an acid having a dissociation onstant greater than that of boric acid and preferably an organic acid having a dissociation constant greater than about $1 \times 10^{-5}$ such as lactic acid, acetic acid, formic acid, propionic acid, butyric acid, hydrochloric acid, phosphoric acid, sulfuric acid and the like. The amine-acid salt and the polyepoxide are reacted in the presence of water and the adduct thus obtained.

An amine adduct of an epoxy group-containing resin that is employed according to the invention is further described by Jerabek, U.S. Pat. No. 4,031,050, Jerabek et al., U.S. Pat. No. 4,017,438 and the resin containing active hydrogen atoms and quaternary ammonium groups prepared by the reaction of a polyepoxide with an amine salt that is employed according to the invention is described by Bosso et al., U.S. Pat. No. 4,101,486, all of which are incorporated herein by reference.

The functional compound reactive with the blocked isocyanate as described by Jerabek et al. is a polyfunctional compound based on a ketimine blocked amine having at least one active amine hydrogen wherein the ketimine blocked amine is reacted with an epoxy compound. In one embodiment these compounds are obtained by reacting the diketimine of diethylene triamine and methyl isobutyl ketone with a polyepoxide.

The various specific isocyanate and thioisocyanate materials that are employed according to the present invention as well as functional compounds containing reactive hydrogen are further described by Hostettler et al. U.S. Pat. Nos. 3,084,177; 3,240,730; 3,392,128 and 3,392,153 as well as Jerabek, Jerabek et al. and Bosso et al., all of which are incorporated herein by reference.

The following examples are illustrative of the invention.

A common method for comparing the degree of cure of a coating is to determine the extent to which a coating is removed by a solvent rub test described in ASTM D 4752-87. This procedure is used in the following examples but uses methyl isobutyl ketone in place of methyl ethyl ketone. Cured panels are tested by rubbing the surface of the panel with a cloth, saturated with methyl isobutyl ketone, for 50 double rubs. The rating system is as follows

| Rating | Appearance of Coating |
| --- | --- |
| 1 | No noticeable effect on coating |
| 2 | Faint abrasion of coating |
| 3 | Moderate abrasion of coating |
| 4 | Significant abrasion of coating |
| 5 | Metal surface exposed. |

EXAMPLE 1

36.8 g bis(tributyltin)oxide (TBTO) are dispersed with 60.8 g aqueous unpigmented resin solution HEQ-8716 obtained from PPG Industries, Inc., an epoxy based. 10.75 g of the resulting emulsion are added to 1824 g of unpigmented E 5993, Trade Name "ED4 Resin" obtained from PPG Industries, Inc., an aqueous coating composition having a film-forming epoxy based resin to form a mixture. The mixture comprises an electro depositable cationic composition based on the reaction of an epoxy resin, an amine and a blocked polyisocyanate and does not contain any pigments or filters. Steel panels, 100×150 cm, are coated on both sides when immersed to a depth of 120 cm in the resulting bath by electrodeposition at 240 volts with initial conductivity of 1 amp for 2 minutes. The coated panels are cured for 20 minutes at temperatures from 135 to 185° C. and tested for degree of cure by the MIBK test. The results of this experiment are shown in Table 1.

EXAMPLE 2

57.7 g bis(trioctyltin)oxide (TOTO) are dispersed with 60.8 g aqueous resin solution as in Example 1. 12.91 g of the resulting emulsion are added to 1824 g of an aqueous composition as n Example 1 and treated as in Example 1. The results of the experiment are shown in Table 1.

EXAMPLE 3

24.0 g bis(triphenyltin)oxide (TPTO) are ground with 32.1 g aqueous resin solution as in Example 1. 11.43 g of the resulting dispersion are added to 1824 g of an aqueous composition as in Example 1 and treated as in Example 1. The results of the experiment are shown in Table 1.

EXAMPLE 4

Control 308 g dibutyltin oxide (DBTO) are ground with 608 g aqueous resin solution as in Example 1. 10.0 g of the resulting dispersion are added to 1824 g of an aqueous composition as in Example 1 and treated as in Example 1. The results of the experiment are shown in Table 1. Dibutyltin oxide is an example of catalysts commercially used for cure of blocked isocyanates.

Table 1: Ratings for Abrasion by MIBK Rub Test All catalysts 0.53 weight a tin based on solids; Oven cure 20 minutes

TABLE 1

| | Oven Temperature, ° C. | | |
| --- | --- | --- | --- |
| Catalyst | 165.5–185 | 148.8 | 135 |
| DBTO | 1 | 4 | 5 |
| TBTO | 1 | 1 | 4 |
| TOTO | 1 | 1 | 3 |
| TPTO | 1 | 1 | 2 |

These results indicate significantly improved cure by the triorganotin oxides at 300° F. (148.8° C.), compared to the control, dibutyltin oxide.

The voltage for each of the coating procedures in Examples 1–4 was 240 volts, while the conductivity dropped from the initial one amp to approximately zero during the course of the electrodeposition. The amperage drop for the electrodeposition ot coating material employing TOTO in Example 2 was at a slower rate than the rate of drop for the electrodepositions in Examples 1 and 3–4, resulting in higher film thickness, especially as compared to the control Example 4 in which DBTO catalyst was employed.

EXAMPLE 5

Example 1 was repeated however, employing an equivalent amount of dibutyl tin oxide (DBTO) as a control and was cured at 180° C. and 150° C. The experiment was repeated using 50% and 25% of the tin compound on a stoichemetric basis. The panels obtained were subjected to a MIBK rub test and a solvent extraction test which was conducted by initially weighing the 10×5 cm steel panel, coating the panel with a 7×5 cm coating and curing the panel as set forth in Example 1 followed by weighing the cured coating. The panel was refluxed in acetone for six hours, dried, and then weighed and the percent weight loss determined.

The experiment was repeated using various organo tin compounds in an amount comprising 1.0%, 0.5% and 0.25% tin by weight based on the weight of the resin solids of the coating composition. Panels were electrolytically coated at either 240 volts or 220 volts and cured at 180° C. and 150° C. and subjected to a MIBK rub test and solvent extraction test. The results are reported in Table 2.

The data of Table 2 illustrate that the catalysts of the present invention can effect cures of urethane compositions at temperatures below 180° C. and are superior to DBTO at lower temperatures.

TABLE 2

| Catalyst Compound | (volts) | % Tin on Solids | | | | | |
|---|---|---|---|---|---|---|---|
| | | 180° C. Cure | | | 150° C. Cure | | |
| | | 1% | 0.5% | 0.25% | 1% | 0.5% | 0.25% |
| | | % Weight Loss Acetone | | | | | |
| DBTO | | 0.3 | −1.5 | −0.9 | 20.6 | 56.1 | 72.0 |
| TOTO | | 4.5 | 1.3 | 0.5 | 8.1 | 7.0 | 20.6 |
| TOTO | | 4.8 | | | 8.0 | | |
| TOTO | (220) | 3.0 | 1.9 | 2.8 | 5.3 | 6.4 | 18.3 |
| TEHTO | | 4.6 | 0.9 | 0.3 | 10.7 | 26.5 | 47.9 |
| TBTO | | −1.0 | 0.3 | 5.2 | 8.2 | 26.0 | 50.3 |
| TPTH | | −0.0 | −1.8 | 4.1 | 9.5 | 30.3 | 53.5 |
| TDTO | (220) | 5.4 | 1.0 | −0.3 | 7.2 | 15.5 | 39.6 |
| TCTH | | 5.4 | 2.1 | 5.1 | 17.6 | 41.2 | 63.8 |
| TOTA | (240) | 2.7 | 1.1 | 3.0 | 20.3 | 32.1 | 56.3 |
| TOTA | (220) | 4.8 | 5.2 | 3.3 | 17.0 | 24.0 | 11.4 |
| TOTL | | −2.7 | 0.1 | 14.3 | 42.1 | 58.6 | 68.4 |
| TOTS | (220) | 3.0 | 8.3 | 20.8 | 55.6 | 47.5 | 62.8 |
| | | MIBK Double Rubs | | | | | |
| DBTO | | 200+ | 200+ | 200+ | 30 | 5 | 2 |
| TOTO | | 200+ | 200+ | 200+ | 200+ | 40 | 20 |
| TOTO | | 200+ | | | 200+ | | |
| TOTO | (220) | | | | | | |
| TEHTO | | 200+ | 200+ | 200+ | 200+ | 50 | 1 |
| TBTO | | 200+ | 200+ | 200+ | 200+ | 20 | |
| TPTH | | | | | | 5 | |
| TDTO | (220) | 50 | 200 | 200+ | 200+ | 150 | 1 |
| TCTH | | 200+ | 200+ | 200+ | 100 | 5 | 1 |
| TOTA | (240) | | | | | | |
| TOTA | (220) | 200+ | 200+ | 200+ | 50 | 2 | 4 |
| TOTL | | 200+ | 200+ | 20 | 2 | 2 | 2 |
| TOTS | (220) | 200+ | 50 | 2 | 3 | 2 | 2 |

The following compounds are employed and listed in Table 2.

Compounds

DBTO (control): Dibutyltin oxide
TOTO: Bis(trioctyltin)oxide
TEHTO: Bis[tri(2-ethylhexyl) tin] oxide
TBTO: Bis(tributyltin)oxide
TPTH: Triphenyltin hydroxide
TDTO: Bis(tridodecyltin)oxide
TCTH: Tricyclohexyltin oxide
TOTA: Trioctyltin acetate
TOTL: Trioctyltin laurate
TOTS: Trioctyltin laurylmercaptide

EXAMPLE 6

Comparison of TOTO with DBTDL in the Reaction of Free Isocyanate with Polvol

The unexpected ability of a triorganotin compound such as TCTO to catalyze an E-coating composition is illustrated by the following.

Experiments were conducted to determine if TOTO significantly catalyzes blocked isocyanates and polyols. Evidence that a catalyst is effective in cross-linking or curing such a mixture is shown by increases in viscosity. In the tabulated data that follow, the isocyanates were not blocked, but free, which means that they were at their greatest activity. If blocked isocyanates were to be used, higher temperatures would be required to remove the blocking agents before reaction would take place between the isocyanate groups and the hydroxyl groups. These data show that the catalyst does not significantly increase reactivity of the free isocyanate from which it can be concluded that its ability to catalyze reactions of the blocked isocyanate would not be any better. DBTDL (dibutyltin dilaurate) with two different levels of tin had gel times of 19 and 31 minutes respectively. Higher level of tin caused gelling to occur more quickly. TOTO did not cause an increase in viscosity for 90 minutes which is not significantly different from the result where no catalyst is used. Accordingly, TOTO would not be expected to be a good catalyst for isocyanate reactions with alcohols at the temperature employed, 67° F.

REACTANTS:

Trimethylhexamethylene diisocyanate—Versanat TMDI (eq wt 106)
Acrylic ployol—Joncryl 500 (eq wt 500)
RATIO of REACTANTS: 1.1:1 (RNCO)/(polyol)
  CATALYST:
  TOTO 0.095% Sn
  DBTDL 0.095% Sn, 0.15% Sn Catalyst performance was compared by measuring increase in viscosity on curing until the gel point was reached. The Mime -c reach the gel point (>7500000) was recorded. The lower the time, the better the catalyst.

Results: Brookfield Viscometer: # 7 spindle, at 0.5 RPM at 67° F.

TABLE 3

| 1. With DBTDL (0.095% Sn) | | 2. With DBTDL (0.15% Sn) | |
|---|---|---|---|
| Time (min) | Visc. (cps.) | Time (min) | Visc. (cps.) |
| 7 | 272000 | 5 | 256000 |
| 11 | 816000 | 7 | 584000 |
| 13 | 1216000 | 11 | 2160000 |
| 17 | 2160000 | 13 | 3272000 |
| 21 | 3280000 | 15 | 4560000 |
| 25 | 4672000 | 17 | 5960000 |
| 29 | 6464000 | 19 | 7600000 |
| 31 | 7520000 | | |
| GEL TIME: 31 min | | GEL TIME: 19.4 min | |
| 3. With TOTO (0.096% Sn) No increase in viscosity for 90 mins (Viscosity remains at 240000 cps) | | 4. No catalyst No increase in viscosity for 90 min | |

EXAMPLE 7

Catalyst Evaluation by Gel Time Measurements using a Brookfield Viscometer

Blocked isocyanates were also evaluated as a "top coat" formulation. A cure temperature of 130° C. was used. The higher cure temperature was for removing the blocking group which in this case was a ketoxime. Even at these higher temperatures, triorganotin oxides required a much longer gel time. Triphenyl tin oxide however reacted quite well. The results were as follows.

TOPCOAT Formulation
REACTANTS:
Ketoxime blocked Hexamethylene diisocyanate— DESMODUR BL-3175A
Acrylic polyol—DESMOPHEN A 600
Methyl isobutyl ketone solvent
Methyl amyl ketone solvent
Propylene glycol methylether acetate solvent
RATIO of REACTANTS: 1:1 (NCO/Polyol)
CATALYSTS @ 0.16% Sn
Catalyst performance was compared by measuring the increase in viscosity on curing until the gel point was reached. The time to reach the gel point 2500 cps was recorded as "Gel Time" using spindle #7, RPM 100. The lower the time, the better the catalyst.
RESULTS

TABLE 4

Cure at 130° C.

| CATALYST | % Sn | Gel Time (min) |
|---|---|---|
| Dibutyl tin diacetate | 0.16 | 21.2 |
| Dibutyl tin oxide | 0.16 | 23.2 |
| Trioctyl tin oxide | 0.16 | >100 |
| Trioctyl tin acetate | 0.16 | >65 |
| Bis Triphenyl tin oxide | 0.16 | 29.2 |

Catalyst Evaluation by Gel Time Measurements using Brookfield Viscometer
POWDER COATING Formulation
REACTANTS:
CAPROLACTAM BLOCKED ISOPHERONE DIISOCYANATE—VEASTAGON B5030
Polyester polyol—Desmophen 680–70
Propylene glycol methylether acetate solvent
RATIO of REACTANTS: 1:1 (NCO/Polyol)
CATALYSTS a 0.16% Sn
Catalyst performance was compared by measuring the increase in viscosity on curing until the gel point was reached. The time to reach the gel point, 2500 cps, was recorded as "Gel Time" using spindle # 7, RPM 100. The lower the time, the better the catalyst.
RESULTS

TABLE 5

Cure at 150° C.

| CATALYST | % Sn | Gel Time (min) |
|---|---|---|
| Dibutyl tin diacetate | 0.16 | 44.5 |
| Trioctyl tin oxide | 0.16 | >60 (no inc. in visc.) |
| Trioctyl tin acetate | 0.16 | >60 (no inc. in visc.) |

EXAMPLE 8

Catalysts were evaluated comprising TOTO or TOTO in combination with a co-catalyst and a hydroxy mercaptan. The coatings were then evaluated for acetone resistance in accord wash the method described in Example 5. The various coating compositions were prepared as follows:

Composition A (TOTO/ZnO/TG—single component all reacted with equal molar amounts of thioglycerol, TG) was the reaction product of trioctyltin oxide, ZnO, and TG together in a methyl isobutyl ketone (MIBK) reaction medium. No additional heating was required beyond that which occurred as the result of an exotherm that is observed to occur. Equal parts by weight, ZnO and trioctyltin oxide were used. The molar amount of TG is equal to the total molar amount of ZnO and trioctyltin oxide. The ratio of tin to zinc-containing components did not appear to have any significant impact on catalytic activity beyond what might be expected from a decrease in tin. Other ratios of tin to zinc are within the scope of this invention, for example anywhere from a 1:1 to 1:10 ratio by weight tin to zinc or other metal co-catalyst. MIBK was rapidly driven off to yield a single component free flowing powder that was readily dispersed with stirring directly into a PPG resin paste for use in an E-coat composition as in Example 1. No milling was required Composition B (ZnO/TG—equal molar reaction product with TG plus later added TOTO) was made by first reacting ZnO in MIBK with an equal molar amount of TG to form ZnTG. Then TOTO was added to the MIBK with stirring. MIBK was rapidly driven off to yield a free flowing powder. The free flowing power is readily dispersed without milling in a PPG paste used in E-coat composition as in Example 1. This provided a single component system that contained both a tin-component and a zinc-component.

Composition C was made by reacting ZnO in MIBK with an equal molar amount of TG to form ZnTG. MIBK was rapidly driven off to yield a free flowing powder which was separately dispersible without milling into a PPG paste that was used to prepare an E-Coat Composition as in Example 1. This provided a two component catalyst system, one a liquid and the other a solid.

Composition D was made by dispersing ZnO with milling into an E-coat Composition as in Example 1 that contained trioctyltin oxide, where the weight ratio of ZnO:trioctyltin oxide is 1:1.

Composition E was made by dispersing dibutyltin oxide in the same E-coat Composition as in Example 1.

Composition F was made by dispersing dibutyltin oxide and zinc oxide in the same E-coat Composition as in Example 1. The results are as follows:

TABLE 9

| Catalyst Composition | Catalyst | Acetone Resistance % weight loss | | | | |
|---|---|---|---|---|---|---|
| (% by Wt. of tin) | % by Wt. of Resin | Cure °C. 140 | 150 | 160 | 180 | 200 |
| A (7.3%) | 1% | 54.9 | 23.9 | 7.5 | 2.1 | 5.3 |
| A (7.3%) | 2% | 42.8 | 13.7 | 4.7 | 4.0 | 9.3 |
| B (7.6%) | 2% | 64.0 | 28.4 | 10.2 | 1.9 | 5.0 |
| C (7.3%) | 2% | 58.2 | 34.7 | 12.3 | 3.9 | 9.9 |
| D (12.7%) | 1% | 33.7 | 14.2 | 3.4 | 0.4 | 4.4 |
| D (12.7%) | 2% | 14 | 5 | 3.5 | 5.0 | 14 |
| E (47.7%) | 1% |  | 52 | 20.5 | 0.2 | 1.1 |
| E (47.7%) | 2% | 68 | 30 | 3.5 | 0.2 | 3 |
| F (23.8%) | 1% |  | 18 | 5.3 | 5.2 | 17.3 |
| F (23.8%) | 2% |  | 16 | 5 | 2.6 |  |

Catalyst Compositions Molecular Weights

| | | |
|---|---|---|
| DBTO | | 248.9 |
| TOTO | | 932.7 |
| ZnO | | 81.4 |
| TG | | 108.2 |

| Catalysts Wt Ratio | DBTO | DBTO/ ZnO | TOTO | TOTO/ZnO | TOTO/ZnO/T |
|---|---|---|---|---|---|
| ZnO:SnO | 0.00 | 1.00 | 0.00 | 1.00 | 1.00 |
| Wt DBTO | 100.0 | 100.0 | | | |
| Wt TOTO | | | 100.0 | 100.0 | 100.0 |
| WT ZnO | 0.0 | 100.0 | 0.0 | 100.0 | 100.0 |
| WT TG | | | | | 271.6 |
| Mol DBTO | 0.40 | 0.40 | 0.00 | 0.00 | 0.00 |
| Mol TOTO | 0.00 | 0.00 | 0.11 | 0.11 | 0.11 |
| Mol ZnO | 0.00 | 1.23 | 0.00 | 1.23 | 1.23 |
| Mol TG | | | | | 2.51 |
| % DBTO | 100.0% | 50.0% | 0.0% | 0.0% | 0.0% |

TABLE 9-continued

| Catalyst Composition | Catalyst | Acetone Resistance % weight loss | | | | |
|---|---|---|---|---|---|---|
| (% by Wt. of tin) | % by Wt. of Resin | Cure °C. 140 | 150 | 160 | 180 | 200 |
| % TOTO | 0.0% | 0.0% | 100.0% | 50.0% | 21.2% | |
| % ZnO | 0.0% | 50.0% | 0.0% | 50.0% | 21.2% | |
| % TG | 0.0% | 0.0% | 0.0% | 0.0% | 57.6% | |
| % Sn | 47.7% | 23.8% | 25.5% | 12.7% | 5.4% | |
| % Zn | 0.0% | 40.2% | 0.0% | 40.2% | 17.0% | |
| % S(m) | | | | | 17.1% | |

EXAMPLE 9

MIBK double rubs

Cured panels are tested by rubbing the surface of the panel with a cloth, saturated with MIBK for 200 rubs. The results are compared to DBTO, the current industry standard.

TABLE 10

MIBK Double Rubs

| Catalyst | % Metal on Solids | Cure Temperature (° C.) | | |
|---|---|---|---|---|
| | | 150 | 160 | 180 |
| DBTO | 1.0 | 30 | | 200+ |
| DBTO | 0.5 | 5 | | 200+ |
| Zn(TG)$_2$ | 0.84 | | <15 | <200 200+ |
| Zn(ME)$_2$ | 0.84 | | <20 | <200 200+ |

Note: Zn(TG)$_2$ is the reaction product of ZnO + thioglycerol
Zn(ME)$_2$ is the reaction product of ZnO + mercaptoethanol

EXAMPLE 10

TABLE 11

Acetone Resistance Test[1]

| Catalyst | % metal on Solids | % Weight Loss Cure Temperature (° C.) | | | | |
|---|---|---|---|---|---|---|
| | | 140 | 150 | 160 | 180 | 200 |
| A. Non-Tin Catalysts | | | | | | |
| Control | | | | | | |
| DBTO | 1.0 | | 32.7 | 3.5 | 0.2 | 2.9 |
| DBTO | 0.5 | | 52.5 | 20.5 | +.02 | 1.1 |
| TOTO | 0.2 | 60.3 | 29.4 | 7.2 | 0.5 | 0.7 |
| Water Soluble | | | | | | |
| ZnO + formic acid | 0.90 | 22.9 | 9.8 | 5.2 | 9.7 | 23.9 |
| ZnAcetate | 0.90 | 23.8 | 10.1 | 5.4 | 14.0 | 26.5 |
| ZnO + propionic acid | 0.90 | 26.8 | 10.7 | 5.0 | 7.8 | 21.2 |
| ZnO + hexanoic acid | 0.90 | 35.6 | 15.0 | 5.5 | 8.8 | 23.8 |
| ZnO + lactic acid | 0.90 | 27.8 | 11.6 | 5.4 | 8.3 | 20.7 |
| ZnO + salicylic acid | 0.90 | (1) | | | | |
| ZnO + thioglycerol | 0.84 | 59.1 | 34.9 | 15.5 | 1.8 | 3.6 |
| ZnO + mercaptoethanol | 0.84 | 53.1 | 28.7 | 8.9 | 0.0 | 1.0 |
| ZnO + thioglycolic acid + ammonium hydroxide | 0.84 | (1) | | | | |
| Water Insoluble | | | | | | |
| Zno + thioglycolic acid | 0.84 | 78.9 | 74.8 | 69.2 | 41.1 | 11.4 |
| ZnO | 0.90 | 17.8 | 7.0 | 3.3 | 3.1 | 5.2 |
| Bi$_2$O$_3$ | 0.90 | 32.2 | 11.0 | 1.3 | +1.2 | +0.2 |
| ZnOxalate | 0.90 | 84.9 | 83.1 | 76.6 | 56.2 | 28.3 |

TABLE 11-continued

Acetone Resistance Test[1]

| | | | | | | | |
|---|---|---|---|---|---|---|---|
| ZnO + succinic acid | | 0.90 | 51.6 | 30.3 | 13.0 | 4.9 | 11.5 |
| ZnO + adipic acid | | 0.90 | 46.5 | 29.7 | 18.0 | 4.6 | 2.8 |
| ZnO + tartaric acid | | 0.90 | 66.8 | 55.2 | 37.4 | 6.5 | 2.1 |

| Catalyst | % Metal on Solids | % Sn on Solids | % Weight Loss Cure Temperature (° C.) | | | | |
|---|---|---|---|---|---|---|---|
| | | | 140 | 150 | 160 | 180 | 200 |

B. Non-Tin + Tin Co-Catalysts

Controls

| | | | | | | | |
|---|---|---|---|---|---|---|---|
| DBTO | | 1.0 | | 32.7 | 3.5 | 0.2 | 2.9 |
| DBTO | | 0.5 | | 52.5 | 20.5 | 0.0 | 1.1 |

Water Soluble metal salt

| | | | | | | | |
|---|---|---|---|---|---|---|---|
| Zn(TG)[2] + DBTO | 0.45 | 0.20 | 55.4 | 24.8 | 5.2 | +1.2 | +0.9 |
| Zn(TG)$_2$ + TOTO | 0.45 | 0.20 | 43.2 | 20.1 | 4.8 | +0.7 | 0.3 |
| Zn(OAc)$_2$ + TOTO | 0.45 | 0.20 | 17.5 | 7.1 | 2.8 | 5.0 | 12.2 |
| Mn(OAc)$_2$ + TOTO | 0.45 | 0.20 | 53.6 | 35.2 | 22.2 | 6.0 | 1.7 |
| Cu(OAc)$_2$ + TOTO | 0.45 | 0.20 | 37.5 | 16.1 | 6.0 | 1.0 | 0.0 |
| Ni(OAc)$_2$ + TOTO | 0.45 | 0.20 | 37.5 | 16.1 | 6.0 | 1.0 | 0.0 |
| Co(OAc)$_2$ + TOTO | 0.45 | 0.20 | 59.6 | 49.5 | 33.6 | 4.4 | 0.2 |
| GeO$_2$ + TOTO | 0.45 | 0.20 | 52.8 | 24.8 | 9.0 | 0.2 | +0.9 |
| Sb(Tartrate) + TOTO | 0.45 | 0.20 | 41.4 | 11.4 | 3.2 | 0.4 | +0.1 |

Water Insoluble metal salt

| | | | | | | | |
|---|---|---|---|---|---|---|---|
| ZnO + DBTO | 0.45 | 0.20 | 29.3 | 9.0 | 2.4 | 1.0 | 3.0 |
| ZnO + TOTO | 0.45 | 0.20 | 25.0 | 8.7 | 3.9 | 5.6 | 14.7 |
| ZnS + TOTO | 0.45 | 0.20 | 68.2 | 51.5 | 28.8 | 3.0 | +0.2 |
| Zn(Oxalate) + TOTO | 0.45 | 0.20 | 52.0 | 20.5 | 5.2 | +0.8 | +1.5 |
| Bi$_2$O$_3$ + DBTO | 0.45 | 0.20 | 36.6 | 7.5 | 0.0 | +1.1 | +0.8 |
| Bi$_2$O$_3$ + TOTO | 0.45 | 0.20 | 16.4 | 4.3 | 0.3 | 0.9 | 2.1 |
| Bi(OAc)$_3$ + TOTO | 0.45 | 0.20 | 51.0 | 31.7 | 9.4 | +0.7 | +1.3 |
| Sb$_2$O$_3$ + TOTO | 0.45 | 0.20 | 53.8 | 20.2 | 3.9 | +0.6 | +1.6 |

| Catalyst | % metal on Solids | % Weight Loss Cure Temperature (° C.) | | | | |
|---|---|---|---|---|---|---|
| | | 140 | 150 | 160 | 180 | 200 |
| Sb$_2$O$_3$ + Tartaric acid | 0.90 | 66.9 | 53.4 | 33.2 | 2.0 | +0. |
| ZnO + MeOH + Succinic Anhydride (1) | 0.90 | 30.7 | 11.6 | 4.9 | 5.9 | 18. |
| ZnO + Acetic Acid | 0.90 | 25.7 | 9.1 | 3.5 | 7.6 | 21. |
| Cu(OAc)$_2$ | 0.90 | 41.2 | 22.8 | 9.8 | 0.4 | +0. |

[1]A coating with an acetone resistance level of 15% or less will pass the MIBK double rub test, i.e. +200.
Note: Zn(TG)$_2$ is the reaction product of ZnO + thioglycerol
(1) Prepared by a two step reaction:
a) MeOH + succinic anhydride to give the half ester
b) ZnO and water The compositions of the present invention can be employed in the manufacture of surface coating compositions which include pigments and fillers, both of which are well known in the surface coating art.

The coatings are applied to metal substrates electrolytically by immersing the substrate in a bath of the coating composition and applying an electric current between the substrate and a counter-electrode in electrical contact with the aqueous coating until a desired coating thickness is deposited on the substrate. The substrate is preferably a cathode.

The metal substrates and especially automobile parts may be coated in an assembly-line manner by arranging the parts on a continuous conveyor belt and running them through the coating bath continuously while passing an electric current between the metal article and a counter electrode as described previously. When the coating is built to a desired thickness, the substrate will be led out of the bath, washed and cured at an elevated temperature continuously in an oven until the desired degree of cure is obtained, whereupon the metal substrate will be led out of the oven and removed from the coating line for further treatment.

During the electrolytic coating, the coating bath through which the metal substrates are passed and coated is continuously or periodically replenished with the coating composition or components of the coating composition such as the resin, and/or tin compounds as described herein.

The foregoing coating compositions may be formulated without any pigment or filler and the triorgano tin compounds employed are liquid catalysts or catalysts that are soluble in the solvent system employed in the coating composition. The liquid organo tin compounds, are preferably employed. Where the liquid catalysts are employed, the coating composition does not require any grinding and shows improved quality in that no "dirt" or precipitated solids develop in the coating bath due to the coating composition. As a result, no solids or less "dirt" is coated onto the metal substrates and further pumping and filtration of the coating composition in the immersion tank is either eliminated or minimized. The liquid catalysts that are used in this regard comprise TETO and TOTO and satisfactory cures are obtained at about 150° C. (approximately 300° F.). Faster coating times i.e., greater throwing power is also obtained using TOTO as well as thicker coatings. This affords additional impact or chin resistance in applications such as applying the coating to automotive undercarriages and side panels exposed to impact from road debris. These thicker coatings also exhibit better corrosion resistance not only because of their thickness but also because pigments are eliminated thereby minimizing the amount of pinholing in the coating. Additionally, when employing catalysts such as TOTO better edge coating of the metal parts is also obtained.

The coating compositions using TOTO are also less toxic than other triorgano tin compounds employed and present less of an environmental and health hazard than such other triorgano tin compounds which is of some consequence where the contents of the immersion coating tanks have to be periodically discharged and replenished.

The coating compositions of the present invention are also applied to polymeric substrates including both thermoplastic and thermosetting polymers, especially polyolefins, phenolics, polyvinylchlorides, polyvinylidine chlorides and fluorides, polyesters, ABS polymers, acrylics, epoxys, polyamides, Teflon® and the like. Treating the polymeric surface with a composition known in the related art that provides electrical conductivity, such as a tin or carbon coating, allows the substrate to be coated electrolytically.

The coating composition is applied by dipping, brushing, spraying, roller coating or by electrodeposition on electroconductive polymeric compositions or metallic substrates.

It will be apparent to those skilled in the art that various modifications and variations can be made to the curable composition containing a catalyst for the low temperature cure of blocked isocyanates or blocked isothiocyanates as well as the method of the invention for obtaining such low temperature cures without departing from the spirit or scope of the invention. It is intended that these modifications and variations of this invention are to be included as part of the invention, provided they come within the scope of the appended claims and their equivalents.

What is claimed is:

1. A curable composition comprising: C D
   (i) a blocked reactive component wherein said blocked reactive component is a blocked isocyanate or a blocked isothiocyanate;
   (ii) a functional compound reactive with said blocked reactive component, said functional compound containing active hydrogen;
   (iii) a catalyst for promoting the reaction of the blocked reactive component with the functional compound, wherein said catalyst is based on the reaction product of manganese, cobalt, nickel, copper, zinc, germanium, or antimony, or the oxides thereof with a mercaptan, or an organic acid, or the reaction product of bismuth or the oxides thereof with an organic acid wherein said organic acid is hexanoic, oxalic, adipic, lactic, tartaric, salicylic, thioglycolic, succinic, or mercapto succinic acid, or the reaction product of copper or germanium, or the oxides thereof with an aliphatic acid wherein said aliphatic acid is formic, acetic, acrylic, methacrylic, propionic, butyric, octanoic, or decanoic acid or the reaction product of germanium or the oxides thereof with hexanoic acid.

2. The composition of claim 1 wherein:
   (i) said blocked reactive component comprises a blocked polyisocyanate;
   (ii) said functional compound reactive with saint blocked reactive component comprises a polyfunctional compound containing active hydrogens.

3. The composition of claim 2 wherein said catalyst is based on zinc, antimony, or bismuth.

4. The composition of claim 2 wherein said catalyst comprises the reaction product of a mercaptan and a compound based on manganese, cobalt, nickel, copper, zinc, germanium, or antimony.

5. The composition of claim 4 wherein said mercaptan is a compound of the formula:

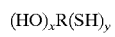

wherein x equals 0 to about 5 and y equals 1 to about 5, the organic radical R having from 2 to about 20 carbon atoms wherein R is a straight chain or branched chain aliphatic group, whether substituted or unsubstituted, where the substituents are alkyl, aryl, cycloalkane or cycloalkene, and the ethers, thioethers or carboxylates thereof; or an aryl, cycloalkane, or cycloalkene group, where the cyclic or aryl groups may be substituted or unsubstituted by alkyl groups having from 1 to about 5 carbon atoms.

6. The composition as in one of claims 3 to 5 wherein said functional compound reactive with said blocked polyisocyanate comprises a polyfunctional compound containing active hydrogens wherein said active hydrogens comprise at least hydroxyl hydrogens of a primary amine epoxy adduct or a secondary amine epoxy adduct.

7. The composition of claim 6 and water.

8. The composition of claim 6 wherein said functional compound reactive with said blocked polyisocyanate comprises a polyfunctional compound containing active hydrogens wherein sail active hydrogens comprise at least hydroxyl hydrogens of a secondary amine epoxy adduct.

9. The composition of claim 6 wherein said functional compound reactive with said blocked polyisocyanate comprises a polyfunctional compound based on a ketimine blocked amine having at least one active amine hydrogen wherein said ketimine blocked amine is reacted with an epoxy compound.

10. The composition of claim 8 and water.

11. The composition of claim 6 wherein said functional compound reactive with said blocked polyisocyanate comprises a polyfunctional compound containing active hydrogens based on a quaternary ammonium salt group solubilized synthetic organic resin obtained by reacting a tertiary amine-acid salt with a polyezoxide to form an epoxy adduct.

12. The composition of claim 11 wherein said quaternary ammonium salt group solubilized synthetic organic resin is an epoxy group-containing adduct of a tertiary amine-acid salt and a polyglycidyl ether of a polyphenol.

13. The composition of claim 11 wherein said quaternary ammonium salt group solubilized synthetic organic resin has a backbone derived from the interpolymerization of an olefinically unsaturated glycidyl compound and at least one other copolymerizable olefinically unsaturated monomer.

14. The composition of claim 11 wherein said quazernary ammonium salt group solubilized synthetic organic resin has a backbone derived from the interpolymerization of an olefinically unsaturated glycidyl compound, a hydroxyalkyl ester of an acrylic or methacrylic acid and at least one other copolymerizable olefinically unsaturated monomer.

15. The composition of claim 6 wherein said functional compound reactive with said blocked polyisocyanate is solubilized with acid to provide cationic groups in said adduct.

16. The composition of claim 15 wherein said functional compound reactive with said blocked polyisocyanate comprises an acid solubilized adduct of a secondary amine and a polyphenol polyglycidyl ether.

17. The composition of claim 1 wherein said catalyst is water soluble.

18. The composition as in claim 17 wherein said composition is substantially free of solid pigments or fillers.

19. The composition of claim 9 and water.

20. The composition of claim 7 wherein said functional compound reactive with said blocked polyisocyanate is solubilized with acid to provide cationic groups in said adduct.

21. The composition of claim 20 wherein said functional compound reactive with said blocked polyisocyanate comprises an acid solubilized adduct of a secondary amine and a polyphenol polyglycidyl ether.

22. The composition of claim 7 wherein said catalyst is water soluble.

23. The composition as in claim 22 wherein said composition is substantially free of solid pigments or fillers.

* * * * *

UNITED STATES PATENT AND TRADEMARK OFFICE
CERTIFICATE OF CORRECTION

PATENT NO.: 6,028,128

DATED: February 22, 2000

INVENTOR(S): Emily C. BOSSERT, Kevin CANON, William D. HONNICK, Wayne RANBOM

It is certified that an error appears in the above-identified patent and that said Letters Patent is hereby corrected as shown below:

In the Claims:

Claim 1, col. 27, line 45, delete "CD",

Claim 2, col. 28, line 4, change "saint" to --said--.

Claim 11, col. 28, line 52, change "polyezoxide" to --polyepoxide--.

Claim 14, col. 28, line 62, change "quazernary" to --quaternary--.

Signed and Sealed this

Nineteenth Day of December, 2000

Attest:

Q. TODD DICKINSON

Attesting Officer     Commissioner of Patents and Trademarks